US012607321B2

(12) United States Patent
(10) Patent No.: US 12,607,321 B2
(45) Date of Patent: Apr. 21, 2026

Friesen et al.

(54) SIGNAL LIGHT FOR VEHICLES HAVING A WAVEGUIDE AND TWO LIGHT SOURCES THAT ARE DIFFUSED

(71) Applicant: Hella GmbH & Co. KGaA, Lippstadt (DE)

(72) Inventors: Paul Friesen, Rheda-Wiedenbrück (DE); Stefan Köhler, Lippstadt (DE); Benedikt Reckert, Welver-Nateln (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/923,879

(22) Filed: Oct. 23, 2024

(65) Prior Publication Data

US 2025/0043933 A1 Feb. 6, 2025

Related U.S. Application Data

(63) Continuation of application No. PCT/EP2023/057967, filed on Mar. 28, 2023.

(30) Foreign Application Priority Data

Apr. 26, 2022 (DE) ......................... 102022110007.3

(51) Int. Cl.
*F21S 43/241* (2018.01)
*F21S 43/249* (2018.01)

(52) U.S. Cl.
CPC ........... *F21S 43/241* (2018.01); *F21S 43/249* (2018.01)

(58) Field of Classification Search
CPC ...... G02B 6/0068; F21S 41/24; F21S 43/235; F21S 43/236; F21S 43/249; F21S 41/18; F21S 43/237; F21S 43/239; F21S 43/241; F21S 43/242; F21S 43/243; F21S 43/245; F21S 43/246; F21S 43/247;
(Continued)

(56) References Cited

U.S. PATENT DOCUMENTS

| | | | | |
|---|---|---|---|---|
| 10,173,584 | B2 * | 1/2019 | Kawabata .............. | G02B 6/002 |
| 2020/0240610 | A1 | 7/2020 | Thomae et al. | |
| 2021/0102681 | A1 * | 4/2021 | Sato ........................ | F21S 43/14 |

FOREIGN PATENT DOCUMENTS

| | | | |
|---|---|---|---|
| CN | 109442343 | A | 3/2019 |
| CN | 209130781 | U | 7/2019 |
| DE | 102012112076 | A1 | 6/2014 |

(Continued)

*Primary Examiner* — Robert J May

(74) *Attorney, Agent, or Firm* — Husch Blackwell LLP

(57) ABSTRACT

A signal light for vehicles has first and second light sources emitting first and second light beams. An optical waveguide contains an entry section with a light entry surface for the light beams. A focusing surface focuses the light from the light sources in a direction (L) in which the light is guided. A deflection section contains a deflecting surface where all of the light is deflected at a deflection angle. In a waveguide section, the light undergoes total internal reflection at an outer surface of the waveguide section, guiding it in the light guidance direction (L) to a light emission surface on the waveguide section. The light sources are placed such that the beams strike the same light entry surface. The light beams are diffused in relation to one another at a diffusion angle difference (Δφ), and the different diffusions of the beams cancel each other out.

12 Claims, 3 Drawing Sheets

(58) Field of Classification Search
CPC .... F21S 43/2492; F21S 43/251; F21S 43/252; F21S 43/253; F21Y 2113/10
See application file for complete search history.

(56) References Cited

FOREIGN PATENT DOCUMENTS

| | | | |
|---|---|---|---|
| DE | 102013107355 | A1 | 1/2015 |
| DE | 102019128663 | A1 | 4/2021 |
| EP | 3486558 | A1 | 5/2019 |
| JP | 2015201278 | A | 11/2015 |
| JP | 2021051950 | A | 4/2021 |
| JP | 2022515179 | A | 2/2022 |
| WO | 2020255845 | A1 | 12/2020 |

* cited by examiner

SIGNAL LIGHT FOR VEHICLES HAVING A WAVEGUIDE AND TWO LIGHT SOURCES THAT ARE DIFFUSED

CROSS REFERENCE

This application claims priority to PCT Application No. PCT/EP2023/057967, filed Mar. 28, 2023, which itself claims priority to German Application No. 10 2022 110007.3, filed Apr. 26, 2022, the entireties of both of which are hereby incorporated by reference.

FIELD OF THE INVENTION

The invention relates to a signal light for vehicles with a first light source that emits a first light beam of a first color, and a second light that emits a second light beam of a second color, which has an optical waveguide containing an entry section with a light entry surface for the light from the first and second light sources, and a focusing surface for focusing the light from the first and second light sources in a direction in which the light is conducted, a deflection section containing a deflecting surface that deflects the light at a deflection angle, a waveguide section in which the light undergoes total internal reflection at an outer surface of the waveguide section and is guided in the light guidance direction to a light emission surface on the waveguide section.

BACKGROUND OF THE INVENTION

DE 10 2012 112 076 discloses a signal light for vehicles that contains an optical waveguide and two light sources that emit light of different colors, each of which emits light into the optical waveguide at different light entry sections. The optical waveguide has two deflection sections that are offset to one another, at which the light from the light sources is deflected and conducted through the same waveguide section to a light emission surface while undergoing total internal reflection in the optical waveguide. This signal light requires a relatively deep installation space, because the light entry sections are behind one another in the direction in which the light is emitted. This signal light is also relatively expensive.

DE 10 2013 107 355 A1 discloses numerous adjacent optical waveguides, each of which have a light entry surface on one side and a light emission surface on the other. The light entry surfaces are each dedicated to at least two light sources that emit light of different colors. Lighting functions of different colors, e.g. daytime running lights and turn signals, can be generated in this manner. The two light sources are symmetrically arranged in relation to a focal point of the lens-shaped light emission surface, which is in a lateral plane at a right angle to the main beam direction. This results in a uniform lighting of the light panel in front of the optical waveguide. The disadvantage with this is that it is relatively expensive, due to the numerous light sources.

DE 10 2019 128 663 A1 discloses a signal light for vehicles that contains an optical waveguide with numerous pairs of light entry sections, each of which is dedicated to a single light source. The light source dedicated to a first light entry section emits light of a first color. The light source dedicated to a second light entry section emits light of a second color. Two different lighting functions, such as white daytime running lights and yellow turn signals, can be generated by this means. The optical waveguide has a deflection section between the entry sections and a waveguide section leading to the light emission surface, which contains four deflection segments, with each entry section dedicated to two deflection segments. Consequently, the light can be deflected such that it intersects, thus mixing it such that the light emission surface of the optical waveguide can be uniformly lit. The disadvantage with this signal light is that it requires a relatively large number of entry sections to generate a desired luminance.

BRIEF SUMMARY OF THE INVENTION

The object of the present invention is to create a signal light for vehicles and a method for generating such a signal light, with which an effective light guidance is obtained in an optical waveguide for generating at least two signal light functions, that is inexpensive and saves space.

To solve this problem, first and second light sources are placed in relation to one another such that the first and second light beams strike the same light entry surface, the light entry and/or focusing surfaces are designed such that the light beams from the first and second light sources are diffused at different angles, the deflection section is designed such that the different diffusions of the first and second light beams from the first and second light sources cancel each other out.

With the invention, each entry section, or light entry surface, has at least two light sources, such that light beams of different colors, preferably for different functions, enter the optical waveguide through the same light entry section. The light entry and/or focusing surfaces of the light entry section are shaped such that the light beams entering there are focused in the light entry section at a defined diffusion angle difference to one another, and strike the deflection section. The deflection section is designed such that the different diffusions of the at least two light beams cancel each other out. Consequently, the light beams can be guided in the same direction through the waveguide section downstream of the deflection section in the light guidance direction, toward a light emission surface through total internal reflection, such that the light emission surface is lit homogenously. This results in a more optically efficient signal light, which also results in an inexpensive means of obtaining at least two different lighting functions.

In a preferred embodiment of the invention, the deflecting surface in the deflection section is shaped such that the diffusion angle difference between the light beams arriving from the entry section and emitted by different light sources is zero, or approaches zero. While the light beams from different light sources light two different regions in the entry section, which partially overlap, they are entirely, or nearly entirely, overlapping in the waveguide section. The defined diffusion of the light beams generated by the entry section is cancelled out or compensated for by the deflection section, such that a homogenous lighting is obtained for different lighting functions.

In a further embodiment of the invention, the deflection section contains numerous prism elements with different surfaces, such that the diffusion of all of the parts of the different light beams striking them can be cancelled out.

In a further embodiment of the invention, the signal light contains numerous light modules, each of which contains a single optical waveguide with a single light entry section. There is a supplementary light module between the two light modules, which contains an optical waveguide with a waveguide section, the first end of which is connected to the optical waveguide in the first light module, while the second end is connected to the optical waveguide in the second light module. The supplementary optical waveguide has a supplementary light source. A strip of light can be obtained between the light modules by this means, generating a decorative effect. The light modules thus appear to be connected. An elongated lighting surface can advantageously be obtained in a simple manner by this means.

In a further embodiment of the invention, the supplementary optical waveguide contains a deflection section and an entry section, in which the deflecting surface of the deflection section is at 90° to the deflecting surface of the light module. Consequently, light is conducted in the waveguide section of the supplementary optical waveguide at a right angle to that in the light modules, this being in the direction connecting the two light modules. Emission elements in the waveguide section of the supplementary optical waveguide deflect the light at a right angle to the direction in which the light is conducted, where it is then emitted at the outer surface thereof. The emission from the waveguide section of the supplementary optical waveguide is therefore in the same direction as that of the light modules.

To achieve the object, the invention is characterized in conjunction with the preamble of claim 12 in that the light beams are conducted in the entry section at a right angle to the direction in which the light is conducted, forming a diffusion offset, and then deflected at an angle, such that the diffusion offset is cancelled out, resulting in the light beams conducted to the light emission surface entirely overlapping one another.

The invention results in a defined diffusion of the light emitted by different light sources in a first section of an optical waveguide, and a defined compensation for the diffusion in the at least two light beams in a second section of the optical waveguide. A defocusing emission of two light beams entering the same optical waveguide from different light sources is converted in a deflection section to overlapping light beams. This advantageously results in an effective lighting from different light sources to generate different lighting functions with the same light-emitting surface (light emission surface).

Other advantages of the invention can be derived from the dependent claims.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
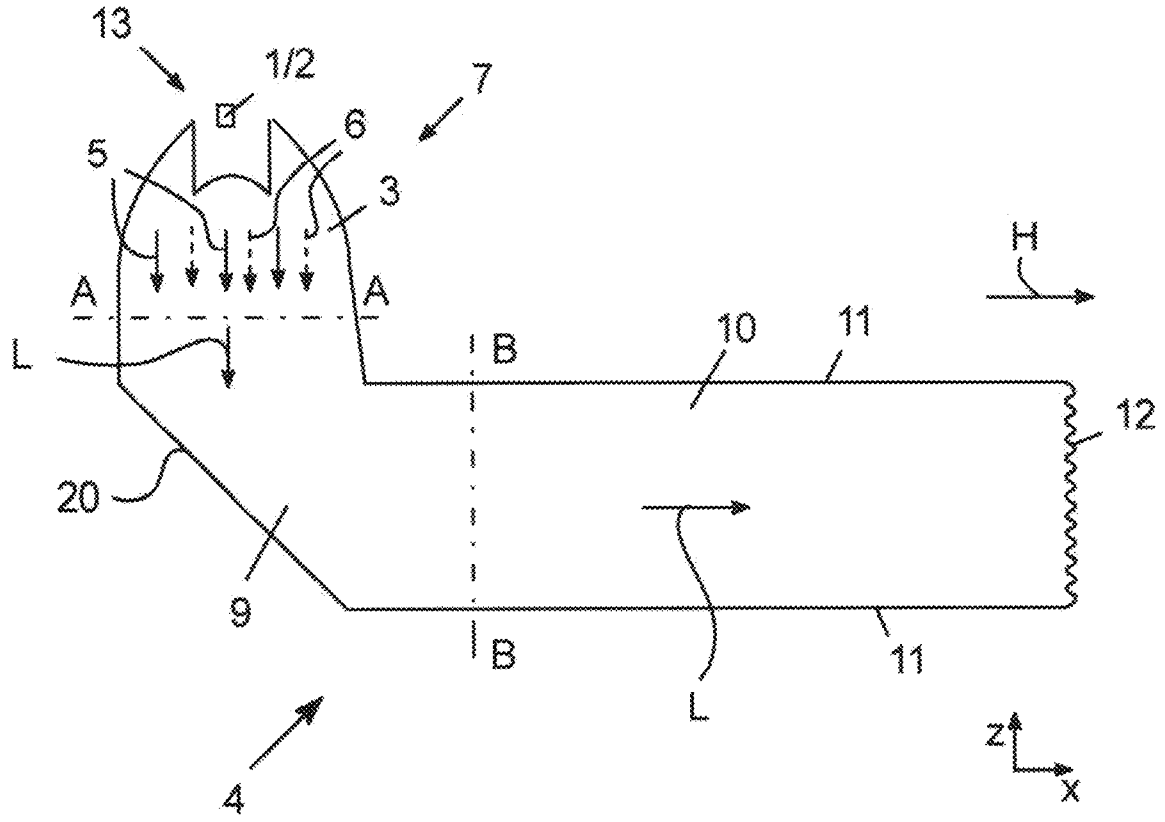
FIG. 1 shows a vertical section through a signal light obtained with the invention, in which the main beam direction runs through the signal light.

A signal light for vehicles obtained with the invention generates at least two different signal light functions. In the present exemplary embodiment, the signal light generates a daytime running light distribution TGL, shown in FIG. 5, and a turn signal light distribution BL, shown in FIG. 6. The daytime running lights TGL and the turn signal BL are generated by two different light sources 1 and 2, each of which is dedicated to the same entry section 3 of an optical waveguide 4 in the signal light. In the present exemplary embodiment, the first light source 1 emits a white light beam 5 (indicated by a solid line in FIG. 1), thus generating the daytime running lights TGL. The second light source 2 emits a yellow light beam 6 (indicated by a broken line in FIG. 1), thus generating turn signals BL. The first light source 1 and second light source 2 are each LED lamps or LED chips, populating the same printed circuit board.

The signal light contains numerous light modules 7 that are integrally connected to one another.

The light modules 7 each contain an optical waveguide 4 and first and second light sources 1, 2, dedicated thereto. The optical waveguide 4 is substantially L-shaped. It has an entry section 3 facing the first and second light sources 1, 2. There is a deflection section 9 at the other end of the entry section 8, where the light beams 5, 6 are deflected substantially 90°, toward the subsequent waveguide section 10. The light beams 5, 6 are conducted in the waveguide section 10 through total internal reflection on the outer surface 11 of the waveguide section 10 in the light guidance direction L to a light emission surface 12 of the waveguide section 10, where the light beams 5, 6 exit the optical waveguide 4 in the main beam direction H. The main beam direction H is aligned with the light guidance direction L in the waveguide section 10, and is perpendicular to the light guidance direction L in the entry section 3.

Figure 2:
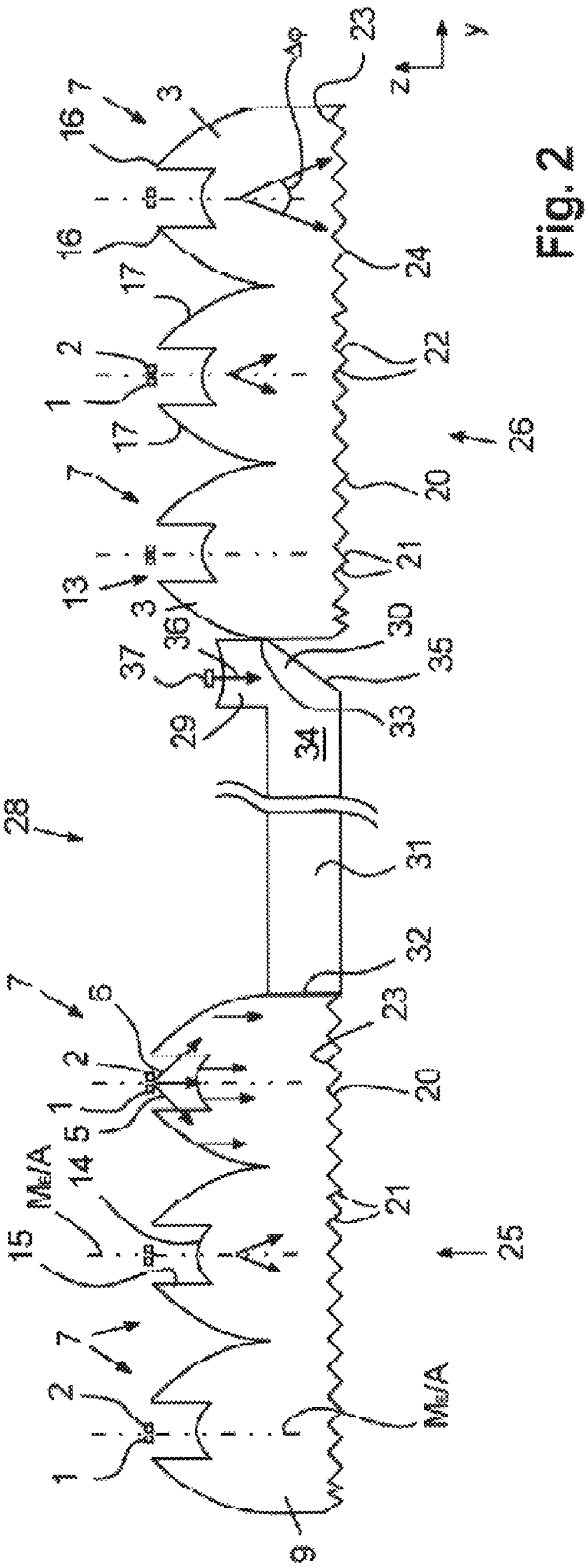
FIG. 2 shows a vertical section through the signal light, which is perpendicular to the main beam direction in the signal light.
Figure 3:
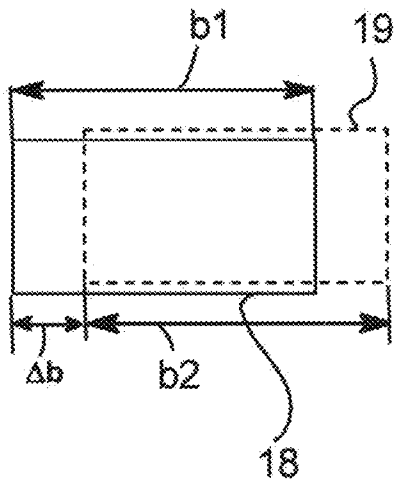
FIG. 3 shows two regions in section A of a light entry surface of an optical waveguide in the signal light shown in FIG. 1, in which the light enters from two different light sources dedicated to the same entry section.

As FIG. 2 shows, the first light source 1 and second light source 2 form pairs, which are placed symmetrically in relation to the longitudinal middle plane $M_E$ of the entry section 3.

The entry section 3 has a light entry surface 13 in the form of a notch. It has a central spherical domed surface 14, encompassed by a raised cylindrical surface 15. The first light source 1 and second light source 2 are in a plane at a right angle to the entry section 3, which is perpendicular to the middle plane $M_E$, in an area containing the outer edges 16 of the cylindrical surface 15.

There is a focusing surface 17 next to the cylindrical surface 15, and therefore the light entry surface 13, which is preferably parabolic. The focusing surface 17 and the central domed surface 14 focus the light beams 5, 6 from the first and second light sources 1, 2 in the light guidance direction L.

FIG. 2 shows that the light beams 5 and 6 striking the central domed surface 14 in the light entry surface 13 are focused toward the deflection section 9, without undergoing total internal reflection in the entry section 3. Light from the light beams 5, 6 striking the cylindrical surface 15 of the light entry surface 13 is reflected toward the deflection section 9 by the focusing surface 17, such that it undergoes just one total internal reflection in the entry section 3.

Because the first light source 1 and second light source 2 are not placed axially to an axis A of the central domed surface 14 and an axis of the focusing surface 17, when the first light source 1 emits light into the light entry section 3, a first region 18 is lit, and when the second light source 2 emits light into the light entry section 3, a second region 19 is lit, which both preferably have the same diffusion widths b1, b2, although the second region 19 is offset to the first region 18 by a diffusion offset Δb at a right angle to the light guidance direction L in the entry section 3. The first light source 1 and second light source 2 are at the same distance to the optical axis A of the domed surface 14, or focusing surface 17, which runs through the middle plane $M_E$.

The light entry section 3 is rotationally symmetrical in relation to the axis A.

Because of the same axial spacing between the first light source 1 and the second light source 2, which are on opposite sides of the middle plane $M_E$, there is a diffusion angle difference $\Delta\varphi$, which is in a plane that is perpendicular to the middle plane $M_E$.

The deflection section 9 has a diagonal deflecting surface 20 at a 45° angle to the light guidance direction of the entry section 8 and the light guidance direction L of the waveguide section 10. The deflecting surface 20 has numerous prism elements 21, which each have side surfaces 22. These surfaces 22 extend from a base line 23 of the prism elements 21, or the deflecting surface 20, to where they meet at the crest 24. The base lines 23 and crests 24 preferably run in straight lines, in the same direction as the deflecting surface 20, i.e. substantially at 40° to the light guidance direction L of the entry section 8, or the waveguide section 10, or an extension thereof. The base lines 23 and crests 24 extend in a plane, such that the diagonal surface 20 is substantially flat.

Figure 4:
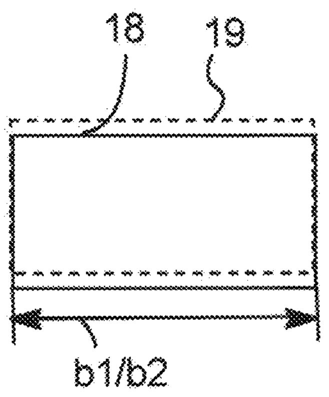
FIG. 4 shows two regions in section B of a waveguide section of the optical waveguide in the signal light shown in FIG. 1, in which the light enters from two different light sources dedicated to the same entry section.
Figure 5:
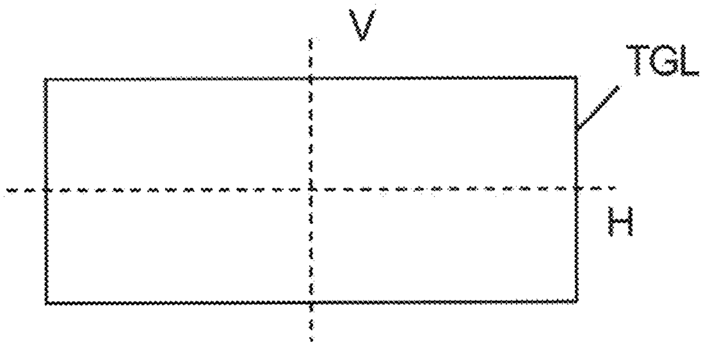
FIG. 5 shows a daytime running light distribution.
Figure 6:
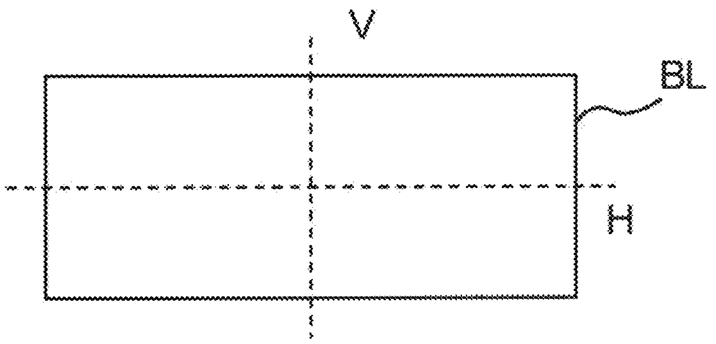
FIG. 6 shows a turn signal light distribution.

The deflecting surface 20, or prism elements 21 are designed such that the diffusion offset $\Delta b$ for the lighting regions 18, 19, or the diffusion angle difference $\Delta\varphi$, is cancelled out. As FIG. 4 shows, the first and second regions 18, 19 of the light beams 5, 6 overlap in the waveguide section 10. Because the first and second light beams 5, 6 are overlapped in the waveguide section 10 by the deflecting surface 20, the light emission surface 12 can be equally lit by both the first and second light sources 1, 2. Consequently, when just the first light source 1 is on, the daytime driving light distribution TGL shown in FIG. 5 is obtained, and when just the second light source 2 is on, the turn signal light distribution BL shown in FIG. 6 is obtained.

The light emission surface 12 forms a narrow side of the waveguide section 10, which is preferably flat. The opposing sides form the total internal reflection outer surfaces 11, which are substantially flat. To generate a linear light beam, or light strip, numerous light modules 7 are placed next to one another. There are six light modules 7 in the present exemplary embodiment, forming two sets of three light modules 7. A first set 25 of three light modules 7 is at a distance 27 to a second set 26 of three light modules 7. There is a supplementary light module 28 between the first and second sets 25, 27, which contains an entry section 29, a deflection section 30, and a waveguide section 31. The waveguide section 31 is connected at a first end 32 to the waveguide section 10 of the first set 25, and at the other end 33 to the waveguide section 10 of the second set 26. The waveguide section 31 thus forms a connecting waveguide section between the waveguide sections 10 of the first and second sets 25, 26. There are emission elements on the back of the waveguide section 31, with which light is emitted through the front surface 34. In the present exemplary embodiment, the waveguide section 31 is offset to the waveguide sections 10 in the light modules 7, such that the signal light is slightly bowed.

The deflecting surface 30 in the supplementary light module 28 forms a diagonal surface, preferably at a 45° angle to the directions of the waveguide section 31 and entry section 29. The deflection section 30 has a deflecting surface 35 that is rotated 90° to the optical axis A of one light module 7 and to the deflecting surface 20 of another light module 7. The deflecting surface 35 therefore deflects the light at a 90° angle to the light guidance direction L in the waveguide section 10. A light beam 36 entering one of the entry sections 29 from a supplementary light source 37 is thus conducted in the waveguide section 31 at a right angle to the light beams 5, 6 in the waveguide section 10 of the light module 7. The entry section 29 is perpendicular to the main beam direction H. The entry section 29 therefore extends in the same direction as the entry section 8 in the light module 7. The light source 37 can be an LED. The deflecting surface 35 can be flat or structured.

The supplementary light module 28 emits a weaker light 36 than the of the light modules 7. The supplementary light module 28 is mainly decorative, optically connecting the two sets 25, 26 of light modules. This results in a continuous light strip between the first and second sets 25, 26 of light modules. The light distributions shown in FIGS. 5 and 6 are generated by just the light modules 7.

The supplementary light module 28 is integrally connected to the sets 25, 26 of light modules. The waveguide sections 10 in the sets 25, 26 are each integrally connected to the waveguide section 31 in the supplementary light module 28. The waveguide sections of the signal light are therefore integrally formed, which is advantageous for the production process.

In an alternative embodiment of the invention, not shown herein, the light modules 7 can be arranged in arbitrary directions behind one another, in which they are aligned with the vehicle. The entry sections 8 can also have more than two dedicated light sources. By way of example, there can be three or four light sources at the same axial spacing to the axis A.

LIST OF REFERENCE SYMBOLS

- 1 1st light source
- 2 2nd light source
- 3 entry section
- 4 optical waveguide
- 5 1st light beam
- 6 2nd light beam
- 7 light module
- 8 entry section
- 9 deflection section
- 10 waveguide section
- 11 outer surface
- 12 light emission surface
- 13 light entry surface
- 14 central domed surface
- 15 cylindrical surface
- 16 outer edges
- 17 focusing surface
- 18 1st light region
- 19 2nd light region
- 20 deflecting surface
- 21 prism elements
- 22 side surfaces
- 23 base line
- 24 crest
- 25 1st set of light modules
- 26 2nd set of light modules
- 27 distance
- 28 supplementary light module
- 29 entry section
- 30 deflection section
- 31 waveguide section
- 32 1st end
- 33 2nd end
- 34 front surface

35 deflecting surface
36 light beam
37 supplementary light source
L light guidance direction
H main beam direction
TGL daylight running light distribution
BL turn signal light distribution
A axis
$M_E$ middle plane
Δφdiffusion angle difference
b1, b2 diffusion width
Δb diffusion offset

The invention claimed is:

1. A signal light for vehicles, the signal light comprising:
a first light source for emitting a first light beam in a first color;
a second light source for emitting a second light beam in a second color; and
an optical waveguide including:
an entry section with a light entry surface for the light from the first light source and second light source;
a focusing surface that focuses the light from the first light source and second light source in a first direction that is substantially perpendicular to a main beam direction (H) in which the light is conducted;
a deflection section containing a deflecting surface where all of the light is deflected at a deflection angle; and
a waveguide section in which the light undergoes total internal reflection at an outer surface of the waveguide section, guiding it in a second direction that is substantially parallel to the main beam direction (H) to a light emission surface on the waveguide section;
wherein the first light source and second light source are placed such that the first light beam and second light beam strike the same light entry surface,
wherein the light entry surface and/or focusing surface are designed such that the light beams from the first light source and second light source are diffused in relation to one another at a diffusion angle difference (Ap), and
wherein different diffusions of the first light beam and second light beam from the first light source and second light source cancel each other out.

2. The signal light according to claim 1, wherein the first light beam from the first light source and the second light beam from the second light source are focused in the entry section with a diffusion angle difference (Δφ) of zero, or approximately zero.

3. The signal light according to claim 1, wherein the deflecting surface contains numerous prism elements, which have side surfaces that converge at a base line.

4. The signal light according to claim 3, wherein the deflecting surface is a diagonal surface on which the prism elements are formed.

5. The signal light according to claim 4, wherein the diagonal surface is flat.

6. The signal light according to claim 1, wherein the first light beam from the first light source strikes a first region of the deflecting surface and the second light beam from the second light source strikes a second region of the deflecting surface, wherein the second region is offset in relation to the first region at a right angle to a light emission direction (L) by a diffusion width (Δb).

7. The signal light according to claim 6, wherein the first light region and the second region overlap in the waveguide section.

8. The signal light according to claim 1, wherein the light entry surface forms a notch with a central dome, which has a cylindrical surface surrounding it, wherein the focusing surface is adjacent to the cylindrical surface, such that the light entering the cylindrical surface strikes the focusing surface.

9. The signal light according to claim 1, wherein the focusing surface is parabolic.

10. The signal light according to claim 1, wherein at least two light modules, formed by the optical waveguide and the at least first and second light sources, are spaced apart, wherein a supplementary light module runs between the two light modules, with a waveguide section that is connected at one end to one light module and at the other end to another light module.

11. The signal light according to claim 10, wherein the waveguide section of the supplementary light module is connected by a deflection section to an entry section, which is dedicated to a light source, and the waveguide section contains light emission elements with which the light entering the waveguide section is emitted at a narrow front surface.

12. A method for generating a signal light, the method comprising:
emitting two light beams from two adjacent light sources;
guiding the two light beams, via a reflection section of an optical waveguide, into an entry section of the optical waveguide in a first direction that is substantially perpendicular to a main beam direction (H), offset to one another at a diffusion offset (Δb);
deflecting the two light beams toward a waveguide section of the optical waveguide, via a deflection section of the optical waveguide, at a deflection angle; and
guiding the two light beams, via the waveguide section of the optical waveguide, in a second direction that is substantially parallel to the main beam direction (H) to exit at a light emission surface that cancels out the diffusion offset (Δb), such that the light beams completely overlap at the light emission surface.

* * * * *